July 21, 1953 W. S. MORTLEY 2,646,509

PIEZOELECTRIC CRYSTAL OSCILLATOR

Filed May 1, 1950 2 Sheets-Sheet 1

Inventor:
Wilfrid Sinden Mortley;
By his attorneys,
Baldwin, Wight, & Brevoot

July 21, 1953 W. S. MORTLEY 2,646,509

PIEZOELECTRIC CRYSTAL OSCILLATOR

Filed May 1, 1950 2 Sheets-Sheet 2

Inventor:
Wilfrid Sinden Mortley;
By his attorneys,
Baldwin, Wight & Prevost

Patented July 21, 1953 2,646,509

UNITED STATES PATENT OFFICE 2,646,509

PIEZOELECTRIC CRYSTAL OSCILLATOR

Wilfrid Sinden Mortley, Great Baddow, Chelmsford, England, assignor to Marconi's Wireless Telegraph Company Limited, London, England, a company of Great Britain Application May 1, 1950, Serial No. 159,210
In Great Britain March 30, 1949

6 Claims. (Cl. 250—36)

Figure 1:
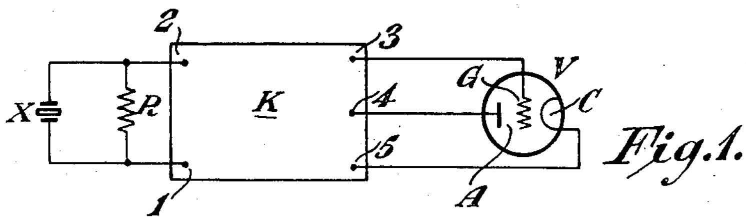

This invention relates to piezoelectric crystal oscillators and more particularly to oscillators of the customary kind in which a piezoelectric crystal is maintained in oscillation by a valve.

As is well known, where it is required to obtain the highest possible frequency stability from a crystal oscillator it is best to cause the crystal to vibrate at a frequency which is as near as possible to that of series resonance. It is also a requirement that a suitable impedance should be presented to the maintaining valve and that the Q value of the crystal shall not be appreciably reduced by the circuits coupling it to the said valve.

The present invention seeks to satisfy these requirements in a simple way.

According to this invention a piezoelectric crystal is coupled to a maintaining valve therefor by means of a line having an electrical length of three-quarters of the operating wave length, the grid point of the valve being coupled to a point a quarter of a wave length from the crystal and the anode point of the valve being coupled to a point three-quarters of a wave length from the crystal or vice versa.

The line may be an actual line with distributed constants or, more usually, it may be an artificial line built up of lumped impedances.

The line may be uniform but this is not a necessary condition and, in fact, as will be seen later, there are advantages to be obtained by using what may be termed a "tapered" line.

In the case in which the line is uniform its characteristic impedance $Z_0$ should be made equal to $$\sqrt{r/g_m}$$

where $r$ is the resistance of the crystal and $g_m$ is the mutual conductance of the valve.

When, as will usually be the case, $Z_0$ is much greater than $r$, a resistance may be connected either across the crystal or across the line at a point half a wave length from the crystal in order to suppress an unwanted mode of oscillation.

The line, if of the artificial type, may take any of a variety of different forms; for example, it may consist of three sections each a quarter of a wave length long and each comprising two shunt condensers and a series inductance so proportional that $\omega^2 LC=1$ and $$Z=\sqrt{L/C}$$

where $\omega$ is a frequency in angular measure, L and C are respectively the inductance and capacity values and Z is the section impedance. Again each section may comprise two shunt inductances of value L and a series condenser of value C. Further the successive sections may differ from one another, that nearest the crystal being of one type (for example series inductance and shunt capacity) while the others are of the other type (series capacity and shunt inductance). Moreover so-called "mixed" or more complex types of section may be used. Again the "pi" sections chosen for illustration could be replaced by their equivalent T sections as will be well understood by those skilled in the art.

Since the quarter wave sections are adjacent one another one of the shunt impedances of one section will be directly in parallel with one of the shunt impedances of the next and therefore obviously these two parallel impedances can be lumped together and constituted by a single equivalent impedance.

Figure 1A:
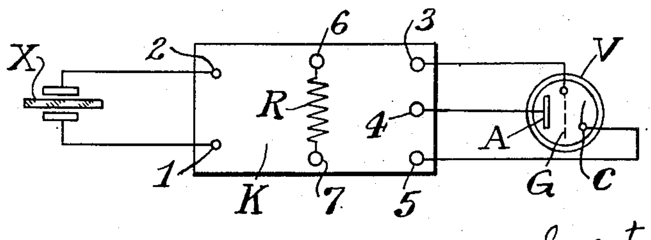

The invention is illustrated in the accompanying drawings in which Fig. 1 is a general diagram of an embodiment of the invention; Fig. 1*a* shows a modified circuit arrangement embodying the invention; Figs. 2 to 7 inclusive show various forms which may be adopted for the three-quarter wave line represented in Fig. 1 by a rectangle. Throughout the figures the five terminals of the line are numbered, the same reference numerals being employed for the same terminals.

Referring to Fig. 1 a crystal X is maintained in oscillation by a valve V shown as a triode having an anode A, control grid G and cathode C though, of course, other types of valves may be used. The crystal and the valve are coupled by a line K which is three quarters of a wave length long and has one end pair of terminals 1, 2, connected across the crystal, another end pair of terminals 4, 5, connected respectively to the anode and cathode points of the valve and a tap terminal 3, one quarter of a wave length from the crystal connected to the grid point of the valve. Since the characteristic impedance $Z_0$ of the line is assumed, in Fig. 1 to be much greater than the resistance $r$ of the crystal the latter is shown as shunted by a resistance R which may, however, be provided instead across the line at a point a half wave length from the crystal as shown in Fig. 1*a* where the terminals 6, 7 provide connection of resistance R to the line at a half wave length from the crystal. In Fig. 1, as in the other figures, potential sources for the valve are, for the sake of simplicity, omitted.

Figure 2:
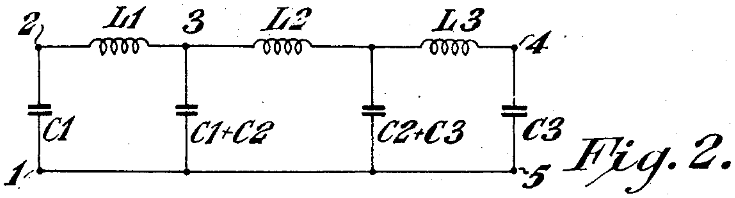

The line K may take any of a variety of forms. For example, as shown in Fig. 2 it consists of three inductances of values respectively $L_1$, $L_2$, $L_3$ in one wire and four shunt capacities respectively of values $C_1$, $C_1+C_2$, $C_2+C_3$ and $C_3$ of which the first is connected across the terminals 1, 2, the second is connected between terminal 3 (which is here the junction of $L_1$ and $L_2$) and the other wire of the line, the third is connected between the junction of $L_2$ and $L_3$ and the said other wire, and the fourth is connected across the remaining terminals 4, 5. In Fig. 2, as in Figs. 3 to 7, the line elements are indicated by their values. The characteristic impedance $Z_1$ of the first section of the network is given by $$\sqrt{L_1/C_1}$$

the impedance $Z_2$ of the second section is given by $$\sqrt{L_2/C_2}$$

and the impedance $Z_3$ of the third section is given by $$\sqrt{L_3/C_3}$$

Also the line elements are so dimensioned that $\omega^2L_1C_1=\omega^2L_2C_2=\omega^2L_3C_3=1$. As will be apparent from the numbering of the line terminals, the maintaining valve (not shown in Fig. 2) has its grid connected to the junction point between $L_1$ and $L_2$, its anode connected to the line terminal corresponding to one end of $L_3$ and its cathode connected to the remaining line terminal at the same end. The crystal (also not shown in Fig. 2) is connected across the terminals at the other end of the line.

Figure 3:
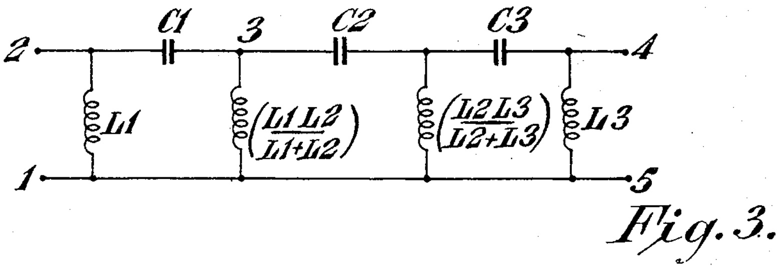

In Fig. 3 each of the three series inductances of Fig. 2 is replaced by a series condenser, and each of the four shunt condensers is replaced by a shunt inductance. The condensers are respectively of values $C_1$, $C_2$, $C_3$ and the inductances are respectively of values $L_1$, $$\frac{L_1L_2}{L_1+L_2}, \frac{L_2L_3}{L_2+L_3}$$

and $L_3$.

Figure 4:
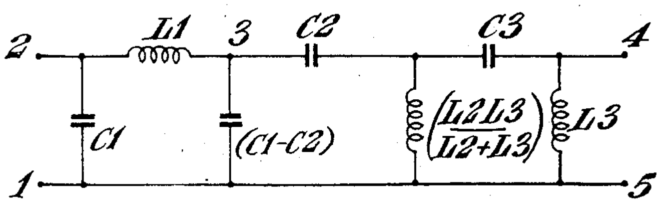

In Fig. 4 the first section of the line consists of a series inductance and two shunt capacities and the other two sections are series capacity and shunt inductance sections. The series elements are of values $L_1$, $C_2$ and $C_3$ respectively and the shunt elements are of values $C_1$, $C_1-C_2$, $$\frac{L_2L_3}{L_2+L_3}$$

and $L_3$ respectively, all as shown.

Figure 5:
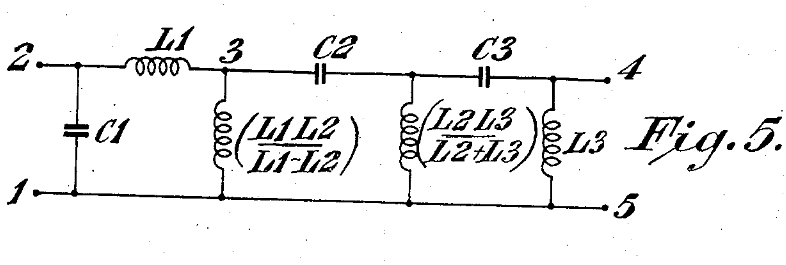

The arrangement of Fig. 4 may be modified as shown in Fig. 5 by replacing the shunt capacity $C_1-C_2$ by a shunt inductance $$\frac{L_1L_2}{L_1-L_2}$$

Figure 6:
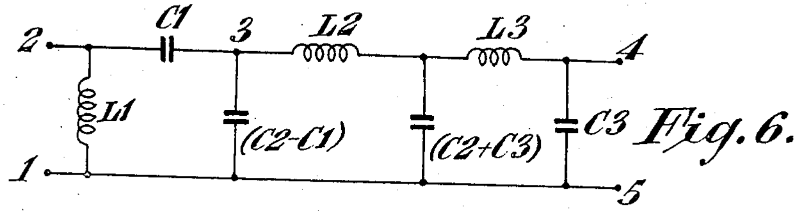

In the arrangement of Fig. 6 the line shown in Fig. 2 is modified by interchanging the impedances $C_1$ and $L_1$ and replacing the shunt capacity of value $C_1+C_2$ by a shunt capacity of value $C_2-C_1$.

Figure 7:
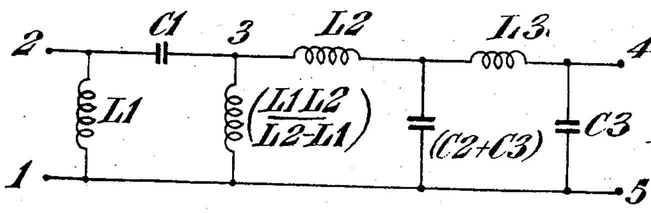

In the arrangement of Fig. 7 the line shown in Fig. 2 is modified by interchanging the impedances $C_1$ and $L_1$ and replacing the shunt capacity $C_1+C_2$ by a shunt inductance of value $$\frac{L_1L_2}{L_2-L_1}$$

As already stated the line need not necessarily be uniform and there is advantage in tapering the line for two reasons: firstly, by tapering the line, two quarter wave sections nearer the crystal (which together make a half wave section) may be made of higher characteristic impedance than the remaining quarter wave section without altering the oscillation conditions. Accordingly this half wave section will be less prone to affect the oscillation frequency by its own instabilities. Secondly, if the quarter wave section most remote from the crystal is of different characteristic impedance from the second, valve instabilities will have less effect if the grid point is coupled to the section having the lower impedance.

If the three quarter-wave sections (counting from the crystal) have characteristic impedances $Z_1$, $Z_2$ and $Z_3$ respectively, correct conditions for oscillation are as given by the expression $$Z_1=\sqrt{Z_2r/(Z_3g_m)}$$

In designing arrangements in accordance with this invention it may be noted that the coupling circuit contributes less instability if the crystal is of high inductance. Further, highest stability is obtained by operating the valve in class A conditions with the crystal oscillations of low amplitude. Automatic gain control may accordingly be applied to the valve with considerable advantage.

The invention is not limited to the use of lines with elements dimensioned precisely as hereinbefore described and, in particular, if $Z_1$, $Z_2$ and $Z_3$ are each considerably greater than $r$ (as is usually the case) the shunt elements of the line adjacent the crystal and a half wave length therefrom are not critical in value and may, indeed, be omitted altogether without serious loss of stability.

Small adjustments of frequency may be made by providing a variable or adjustable susceptance between the cathode and either the grid or the anode of the valve.

I claim:

1. In a piezoelectric crystal oscillator arrangement, a piezoelectric crystal, a maintaining valve therefor including at least a cathode, a grid and an anode electrode, a line having an electrical length of three-quarters of the operating wave length, means coupling said crystal to one end of said line, a connecting point on said line at the other end thereof, a connecting point on said line at a quarter of a wave length from said crystal and means coupling the anode of the valve to one of said connecting points and means coupling the grid of said valve to the other of said connecting points.

2. In a piezoelectric crystal oscillator arrangement a piezoelectric crystal, a maintaining valve therefor including at least a cathode, a grid and an anode electrode, a line having an electrical length of three-quarters of the operating wave length, said line being an artificial line composed of lumped impedances, means coupling said crystal to one end of said line, a connecting point on said line at the other end thereof, a connecting point on said line at a quarter of a wave length from said crystal, means coupling the anode of the valve to one of said connecting points and means coupling the grid of said valve to the other of said connecting points.

3. A piezoelectric crystal oscillator arrangement as set forth in claim 1 wherein the line is uniform.

4. A piezoelectric crystal oscillator arrangement as set forth in claim 1 wherein the line is tapered.

5. In a piezoelectric crystal oscillator arrangement a piezoelectric crystal, a maintaining valve therefor including at least a cathode, a grid and an anode electrode, a line having an electrical length of three-quarters of the operating wave length, means coupling said crystal to one end of said line, a connecting point on said line at the other end thereof, a connecting point on said line at a quarter of a wave length from said crystal, means coupling the anode of the valve to one of said connecting points, means coupling the grid of said valve to the other of said connecting points and a resistance connected across the crystal.

6. In a piezoelectric crystal oscillator arrangement a piezoelectric crystal, a maintaining valve therefor including at least a cathode, a grid and an anode electrode, a line having an electrical length of three-quarters of the operating wave length, means coupling said crystal to one end of said line, a connecting point on said line at the other end thereof, a connecting point on said line at a quarter of a wave length from said crystal means coupling the anode of the valve to one of said connecting points, means coupling the grid of said valve to the other of said connecting points and, a resistance connected across the line at a point half a wave length from the crystal.

WILFRID SINDEN MORTLEY.

References Cited in the file of this patent

UNITED STATES PATENTS

| Number | Name | Date |
|---|---|---|
| 2,551,809 | Mortley | May 8, 1951 |

FOREIGN PATENTS

| Number | Country | Date |
|---|---|---|
| 622,140 | Great Britain | Apr. 27, 1949 |